United States Patent [19]
Allen

[11] Patent Number: 5,847,830
[45] Date of Patent: Dec. 8, 1998

[54] METHOD FOR MEASURING RETARDED LIGHT THROUGH VERY LONG BASELINE INTERFEROMETRY AND NATURAL OR ARTIFICIAL DIFFRACTION EFFECTS

[76] Inventor: Allen D. Allen, 4236 Longridge Ave, Penthouse 302, Studio City, Calif. 91604

[21] Appl. No.: 777,014

[22] Filed: Mar. 12, 1997

[51] Int. Cl.[6] ...................................................... G01B 9/02
[52] U.S. Cl. ............................................................. 356/354
[58] Field of Search ..................................... 356/345, 354, 356/353; 342/357

[56] References Cited

U.S. PATENT DOCUMENTS

| | | | |
|---|---|---|---|
| 4,170,776 | 10/1979 | MacDoran | 342/357 |
| 5,276,500 | 1/1994 | Koehler | 356/345 |

Primary Examiner—Samuel A. Turner
Attorney, Agent, or Firm—David H. Judson

[57] ABSTRACT

Methods are provided for measuring retarded light that takes longer than x/c time to travel through a vacuum to a detector x distance from the source. The method exploits the frame invariance of in vacuo light speed c and the quantum mechanical nature of photons. It includes placing instrumentation packages consisting of detectors, broadband recording devices and atomic clocks at large distances from each other and from the source of an electromagnetic signal, such that the detectors are located at the extreme sidebands of light that has been diffracted by natural or artificial processes. The data are combined and analyzed using the standard techniques of very long baseline interferometry. This method is useful for providing on the order of a half minute of extra data from the past for distant astronomical events. The method is also useful for providing on the order of tenths of microseconds of extra data from the past for electric meteorological events.

7 Claims, 3 Drawing Sheets

METHOD FOR MEASURING RETARDED LIGHT THROUGH VERY LONG BASELINE INTERFEROMETRY AND NATURAL OR ARTIFICAL DIFFRACTION EFFECTS

TECHNICAL FIELD

The present invention relates generally to methods for measuring electromagnetic radiation that has taken longer than x/c time to travel through a vacuum to a detector x distance from the source (retarded light). More particularly the present invention relates to the combination of very long baseline interferometry and natural or artificial diffraction effects to measure in vacuo light that has traveled an extra distance to the detector at the frame-invariant speed c.

BACKGROUND OF THE INVENTION

Any imaging device detects past events due to the finite speed c of light in a vacuum. Astronomers necessarily detect light from events in the distant past because of the great distances light must travel from a star to a detector on or near the Earth. Some science fiction authors, such as Isaac Asimov, have imagined cameras capable of photographing events that occurred in the Earth's distant past without being at a significant distance from the Earth. Of course, these authors attempt no explanation of how such a camera would work. The present invention can at least image events in the relatively recent past. This would be useful for many fields of research.

Suppose, for example, that at a particular point in time astronomers on Earth see a new supernova begin to explode. If we could see the star even a half minute before the explosion were noticeable on Earth, it could be useful in elucidating the stellar processes that lead to supernovae. Or suppose meteorologists could see what was going on in a thunderhead two tenths of a microsecond before a lightning discharge of that same duration began. This could be instructive in modeling the complex processes that occur during lightning bolts.

The measurement of such retarded light is made possible by the following proven principles, all of which are well understood by those in the art:

1. The speed of light c in a vacuum is frame independent. This, for instance, alters temporal durations for moving and stationary observers.

2. Unlike massive particles, quantum mechanical particles, including photons, do not have classical trajectories but instead have a probability density current. Due to the increasing uncertainty product $\Delta p_x \Delta x$ between momentum $p_x$ and position $x, p_x$ fixed, any wave packet broadens in coordinate space as time progresses. A 0.22 caliber bullet, for instance, is localized to 0.1 millimeter and can maintain its shape in coordinate space for about $10^{24}$ seconds. But an electron localized to an angstrom retains its form for only about $10^{-16}$ seconds.

3. The bands in a diffraction pattern reflect the amplitude of the light wave in various regions of space and, as such, reflect the probability $|\Psi(x, t)|^2$ of detecting a photon in that region.

4. The outcome of a quantum mechanical experiment can be determined by the way we prepare a measurement. If, for example, we use any means to determine which of two slits in a double-slit diffraction experiment a particle moves through, then the double-slit diffraction pattern will vanish.

Consider the diffraction pattern shown in FIG. 1. The high-amplitude central-band photons travel to the detector in time $$t = \tau + \Delta x/c, \quad (1)$$

where $\tau$ is the light travel time to the diffraction slit. If the speed c were not frame invariant, the low-amplitude sideband photons, many wavelengths out from the central band at distance $\Delta y$, would travel at a higher speed to catch up to the central-band photons, as in Bernoulli's principle. However, since c is frame invariant, the sideband photons must travel to the detector in time $$t' = \tau + (\Delta x^2 + \Delta y^2)^{1/2}/c, \quad (2)$$

such that the difference in travel times is, $$0 < \Delta t = t' - t = [(\Delta x^2 + \Delta y^2)^{1/2} - \Delta x]c^{-1}. \quad (3)$$

It is apparent from equation (3) that for the delay $\Delta t$ in travel times to be significant for the scale of the experiment, $\Delta y$ must be more than a small fraction of $\Delta x$. If we have $\Delta x = \Delta y$, for instance, then $\Delta t$ has the same order of magnitude as $\Delta x/c$, $$\Delta t = (\sqrt{2} - 1)\Delta x/c. \quad (4)$$

This means that retarded photons will be in the extreme sidebands, and will have low amplitude and a low probability of detection. However, we can compel detection of the retarded photons by placing a pair of detectors at those sidebands and nowhere else. Of course, this will destroy the diffraction pattern. But it will not alter the position where the photons are detected; thus, equation (3) will still hold. In other words, this placement of the detectors is equivalent to blocking off the imaginary middle segments that become the source for secondary wavelets when a wave crest passes through a diffraction slit.

BRIEF SUMMARY OF THE INVENTION

It is apparent from equations (3)–(4) that for the delay $\Delta t$ in travel times to be significant for the scale of the experiment, $\Delta x/c$ must have a significant magnitude. It is, therefore, an objective of the present invention to detect naturally diffracted or artificially diffracted photons at extreme sidebands over long distances. Due to the inverse square law, this requires detecting light that has a very low luminous intensity. A proven technique for achieving this objective is very long baseline interferometry (VLBI).

Radio astronomers use VLBI to detect ultra-low intensity signals with resolutions on the order of $10^{-3}$ arc-second, equivalent to resolving a basketball on the moon. The data from the distant detectors has to be recorded on broadband tapes and analyzed off-line. An atomic clock is used with each detector to synchronize the data for coherence and can produce synchronization somewhat better than $10^{-6}$ second. Of course, radio astronomers are already detecting light from the past in that have traveled far from its source. For that very reason, the routine use of VLBI does not detect past light in the sense of equation (2). VLBI dish antennas are typically thousands of kilometers apart, which is an insignificant distance when the source of the radiation is light years away. The novelty of the present method is in using the techniques of VLBI for purposes of equation (2) so we can detect past light from a relatively close distance.

One particular objective of the present invention is to detect retarded light that has been diffracted through natural processes by placing two or more VLBI type instrumentation packages at the extreme sidebands of the light. Another objective is to detect retarded light that has been artificially diffracted by placing two or more VLBI type instrumentation packages at the extreme sidebands produced by a diffraction device that selects monochromatic wavelengths from naturally occurring light with source slits and lenses.

The foregoing has outlined some of the more pertinent objects of the present invention. These objects should be construed to be merely illustrative of some of the more prominent features and applications of the invention. Many other beneficial results can be attained by applying the disclosed invention in a different manner or by modifying the invention. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION

By way of brief background, it is well known that the speed of light is frame invariant. Yet, the effect of this on diffraction is not obvious until after it has been disclosed. Whereas dispersion and refraction arise from a refractive index larger than unity, diffraction through a vacuum also alters the path of light but must do so with a transformation of time, just as when an observer is in motion.

Figure 1:
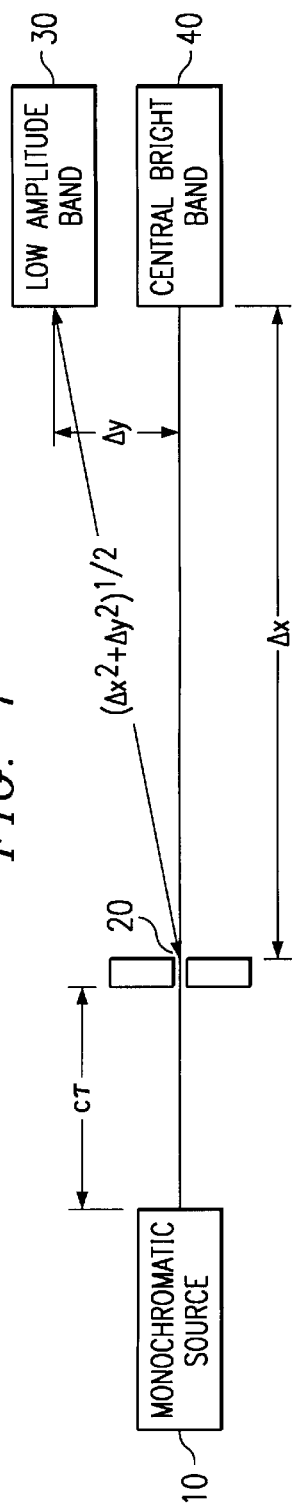
FIG. 1 is a schematic representation illustrating the basic physical principles underlying retarded light.

FIG. 1 is a schematic representation of the diffraction of light. The high-amplitude central-band photons from the source 10 travel to the detector in time $$t = \tau + \Delta x/c, \qquad (1)$$

where $\tau$ is the light travel time to the diffraction slit 20. If the speed c were not frame invariant, the low-amplitude sideband photons 30, many wavelengths out from the central band 40 at distance $\Delta y$, would travel at a higher speed to catch up to the central-band photons, as in Bernoulli's principle. However, since c is frame invariant, the sideband photons must travel to the detector in time $$t' = \tau + (\Delta x^2 + \Delta y^2)^{1/2}/c, \qquad (2)$$

such that the difference in travel times is, $$0 < \Delta t = t' - t = [(\Delta x^2 + \Delta y^2)^{1/2} - \Delta x]c^{-1}. \qquad (3)$$

It is apparent from equation (3) that the delay $\Delta \tau$ in travel times will be significant for the scale of the experiment when $\Delta y$ is more than a small fraction of $\Delta x$. If we have $\Delta x = \Delta y$, for instance, then $\Delta \tau$ has the same magnitude as $\Delta x/c$, $$\Delta \tau = (\sqrt{2} - 1)\Delta x/c. \qquad (4)$$

It is well known that the various amplitudes of the various bands in the diffraction pattern reflect various probabilities of detecting a photon in that region. Photons for which $\Delta \tau$ is significant in equation (3), that is, retarded photons, will be in the extreme sidebands. Consequently, they will have low amplitude and a low probability of detection. However, it is also well known that we can compel detection of the retarded photons by placing a pair of detectors at those sidebands and nowhere else. This will destroy the diffraction pattern but it will not alter the position where the photons are detected; thus, equation (3) will still hold. In other words, this placement of the detectors is equivalent to blocking off the imaginary middle segments that become the source for secondary wavelets when a wave crest passes through a diffraction slit.

It is apparent from equation (3) that we want $\Delta y$ to be of significant magnitude in comparison to $\Delta x$, as in equation (4) where $\Delta y = \Delta x$, and we want $\Delta x/c$ to be of significant magnitude. Although not meant to be limiting, it is convenient to accomplish these objectives by placing two or more VLBI instrumentation packages in space.

Figure 2:
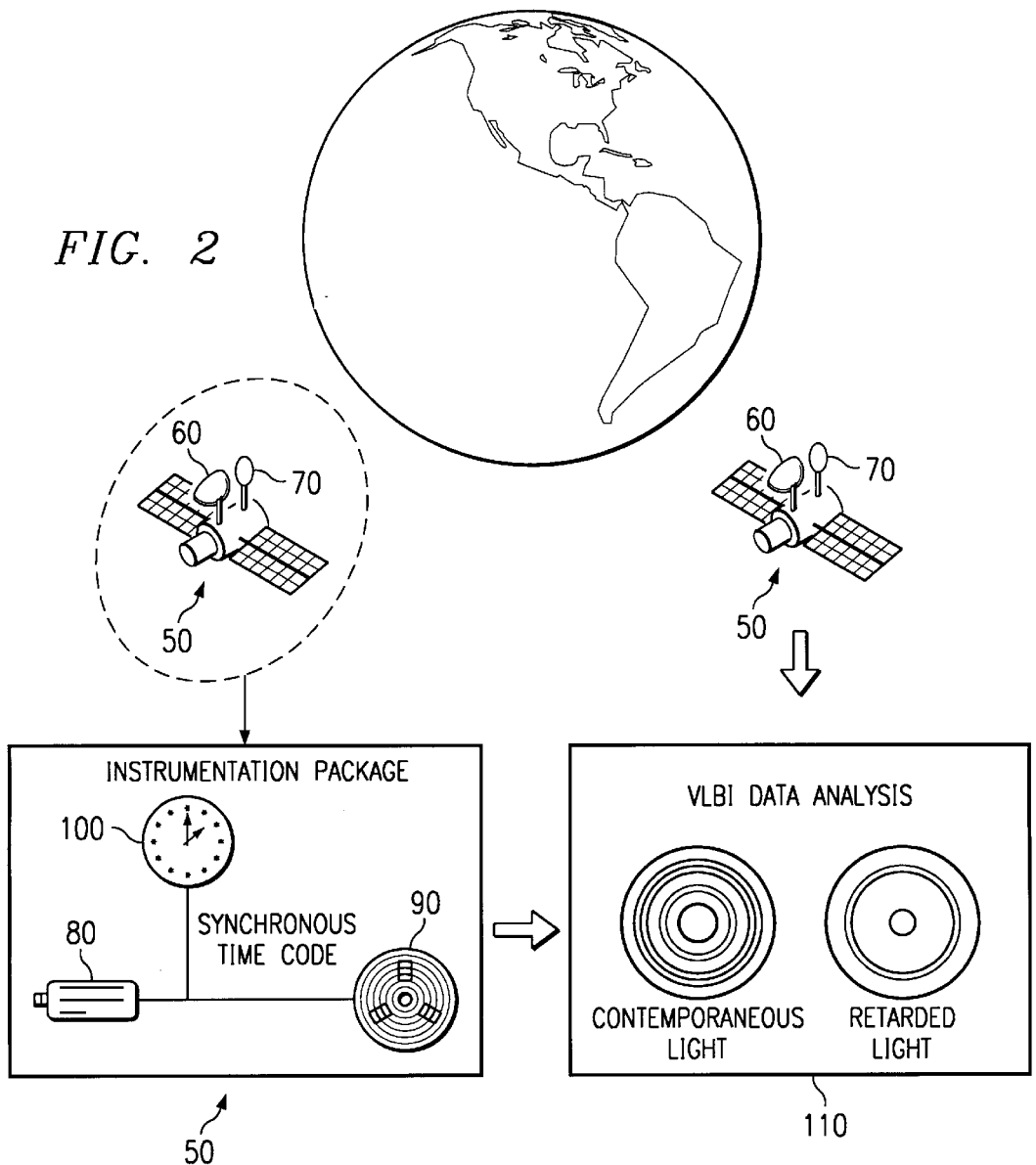
FIG. 2 illustrates the general placement of a pair of space-based VLBI type instrumentation packages in orbit.

FIG. 2 illustrates the general method of having a pair of VLBI instrumentation packages 50 in orbit. The instrumentation packages 50 will include exterior instruments such as a parabolic antenna 60 for collecting radio signals and a high-gear antenna 70 for telemetry. The detectors 80 in the instrumentation packages will collect data to be stored in a recorder 90 which will be time coded by an atomic clock 100. The recorded data can be transmitted back to Earth or, for near Earth orbits, retrieved by space mission. Once the data is collected, it can be synchronized by the atomic clocks to maintain coherence at which point the data can be combined and analyzed by VLBI data analysis 110.

Figure 3:
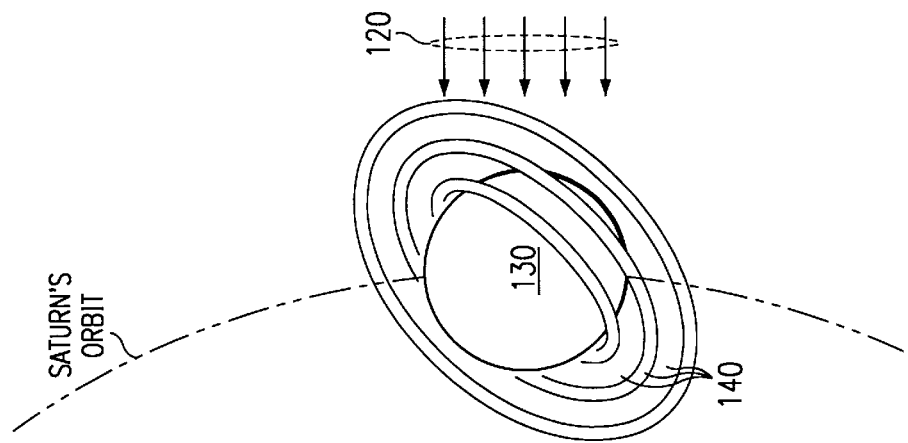
FIG. 3 is a schematic representation illustrating the detection of naturally diffracted retarded radio signals from beyond Saturn for stellar science.
Figure 3:
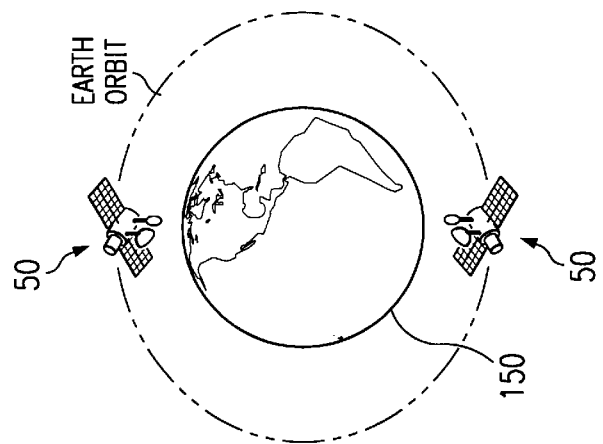

FIG. 3 is a schematic showing the detection of a retarded radio signal 120 that originates beyond Saturn 130 and diffracts through the rings of Saturn 140. The VLBI instrumentation packages 50 are two astronomical units (AU) apart in the orbit of the Earth 150, approximately $1,285.35 \times 10^{-6}$ km from Saturn (mean distance from sun=9.569 AU). Parabolic antennae on the satellites are aligned to the extreme sidebands of the distant radio event and the receiver is tuned to the monochromatic frequency of the natural diffraction process. In this example the radio signal arrives late by about 29 seconds. If the event in question is rare and rapidly evolving, an extra half minute or so of past data transmitted back to Earth could be useful in understanding the physical processes that underlie the radio event.

Figure 4:
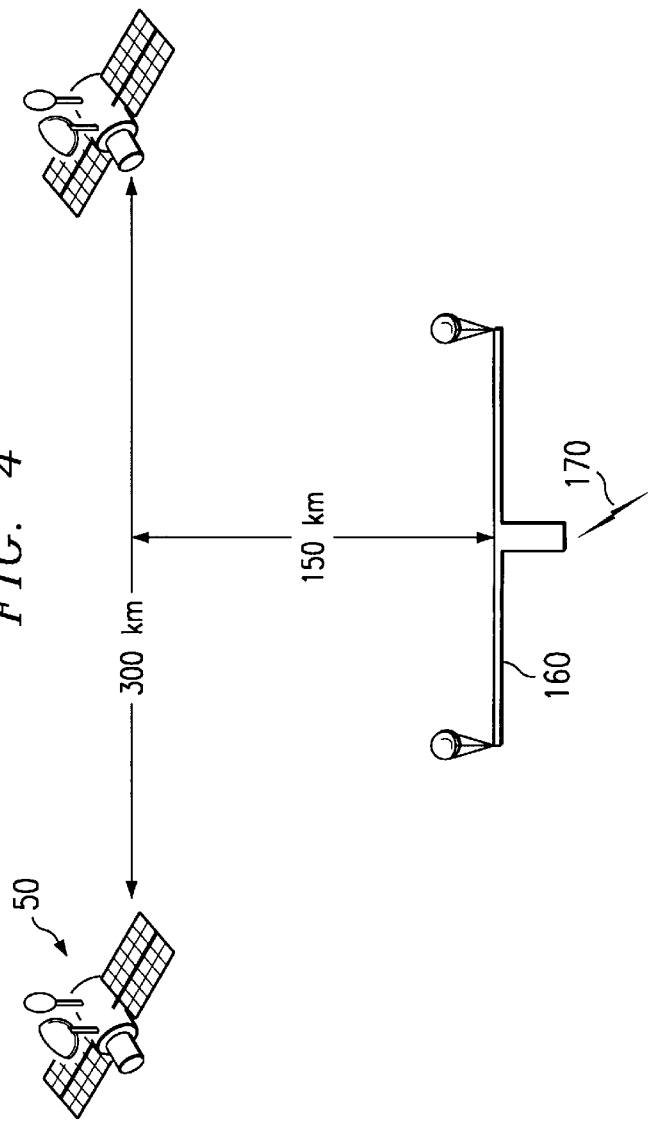
FIG. 4 is a schematic representation illustrating the detection of artificially diffracted retarded light from a lightning bolt for meteorological studies.

FIG. 4 is a schematic showing the detection of retarded light from a lightning jet or sprite using artificial diffraction. In this example the pair of VLBI instrumentation satellites 50 carry visible light detectors in geostationary orbit 150 kilometers above the Earth. The detectors are separated by 300 kilometers and Los Alamos, N. Mex. is centered between them. During a nighttime thunderstorm over Los Alamos, balloons or aircraft carry a large opaque foil 160 with a Fraunhofer type diffraction apparatus in its center over the top of the thunderheads. A lightning jet 170 flashes under the foil and monochromatic light diffracts through the airborne foil, arriving at the orbiting detectors after $7 \times 10^{-4}$ seconds. This is $2 \times 10^{-4}$ seconds late since the contemporaneous light travel time is only $5 \times 10^{-4}$ seconds, the rest of the travel time coming from equations (3) and (4). The delay in this case could be about as long as the event itself. Typically, a lightning flash is comprised of some 50 individual bolts lasting for about $2\times10^{-4}$ seconds each with an interval of $2\times10^{-2}$ seconds between bolts. Once the data have been transmitted to Earth or retrieved during a space mission, data analysis can help us elucidate the ultrabrief processes that occur in lightning flashes.

Figure 5:
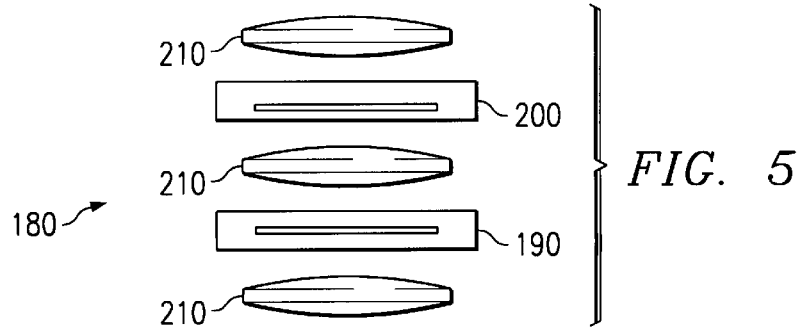
FIG. 5 is a diagram of a diffraction device.

FIG. 5 illustrates a diffraction device 180 that will obtain monochromatic wavelengths. The device will have two slits for the passage of light waves, the source slit 190 and the diffracting slit 200. Sandwiching these slits will be lenses 210 which will adjust the light waves accordingly.

Thus, as illustrated by the above embodiments, the present invention exploits the invariance of light speed and the quantum-mechanical nature of photons to combine VLBI with natural or artificial diffraction processes as a novel method of detecting retarded light, thereby providing scientists in a variety of fields with experimental data that would not otherwise be available.

What is claimed is:

1. A method for imaging an event in retarded diffracted light by placing at least two instrumentation packages at extreme sidebands of the diffracted light to collect data on the diffracted light, and using techniques of very long baseline interferometry to combine and analyze the data.

2. The method of claim 1 wherein the instrumentation packages are placed in space at a predetermined distance.

3. The method of claim 1 wherein the diffracted light is naturally occurring.

4. The method of claim 1 wherein the diffracted light is artificially induced.

5. The method of claim 4 wherein the artificially induced diffracted light is generated by a large foil with a Fraunhofer type diffraction apparatus lifted above a thunderstorm.

6. The method of claim 1 wherein the instrumentation packages consist of at least one detector with at least one data recorder that are time coded by at least one atomic clock.

7. The method of claim 6 wherein the techniques of very long baseline interferometry include:

(a) obtaining the data from the instrumentation packages; and (b) synchronizing the data by the time code from the atomic clock.

* * * * *